M. BOHN.
APPARATUS FOR SEPARATING GRANULAR ADMIXTURES FROM CLAY AND LIKE PLASTIC SUBSTANCES.
APPLICATION FILED SEPT. 29, 1910.
1,033,377.
Patented July 23, 1912.
4 SHEETS—SHEET 1.
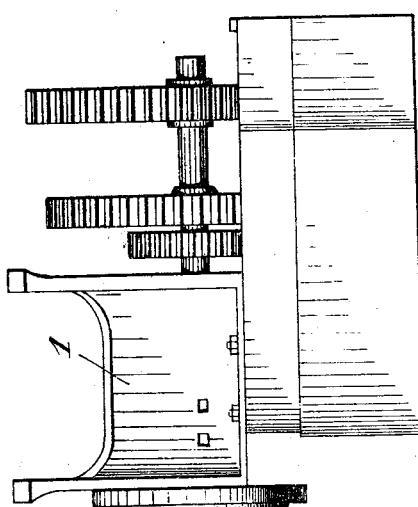
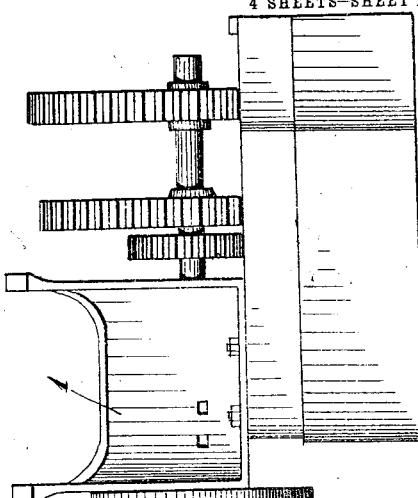
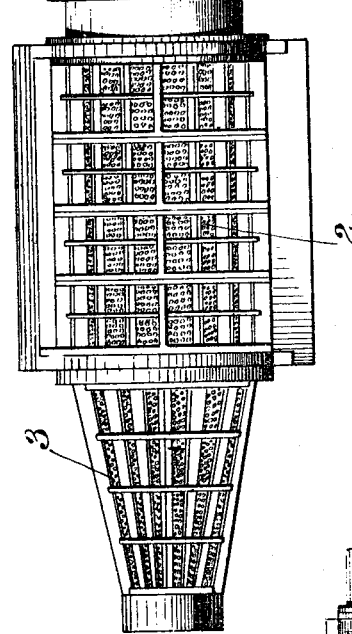
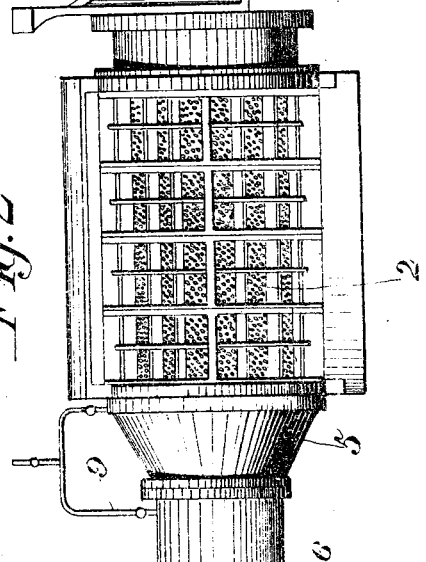
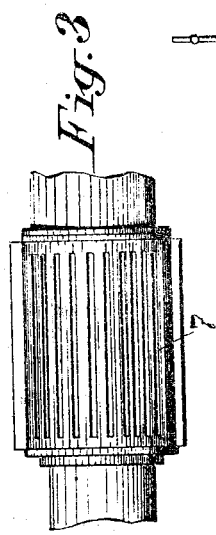
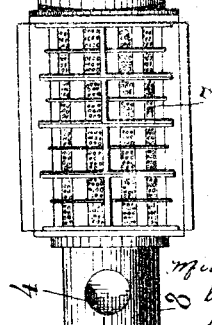

M. BOHN.
APPARATUS FOR SEPARATING GRANULAR ADMIXTURES FROM CLAY AND LIKE PLASTIC SUBSTANCES
APPLICATION FILED SEPT. 29, 1910.
1,033,377.
Patented July 23, 1912.
4 SHEETS—SHEET 2.
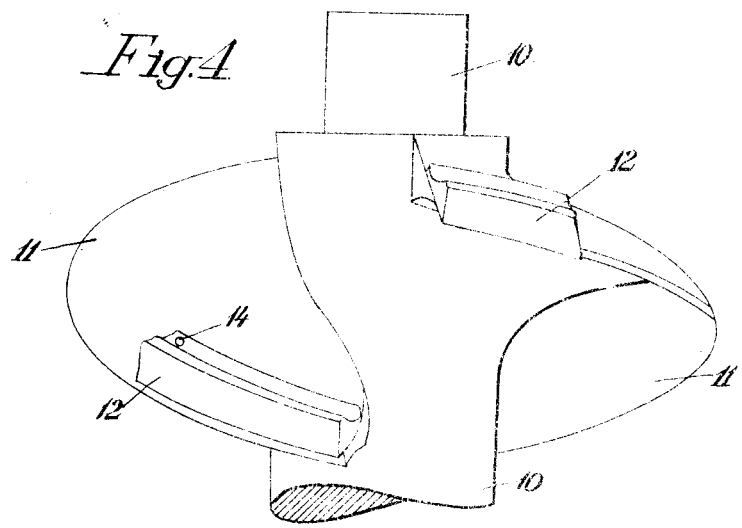
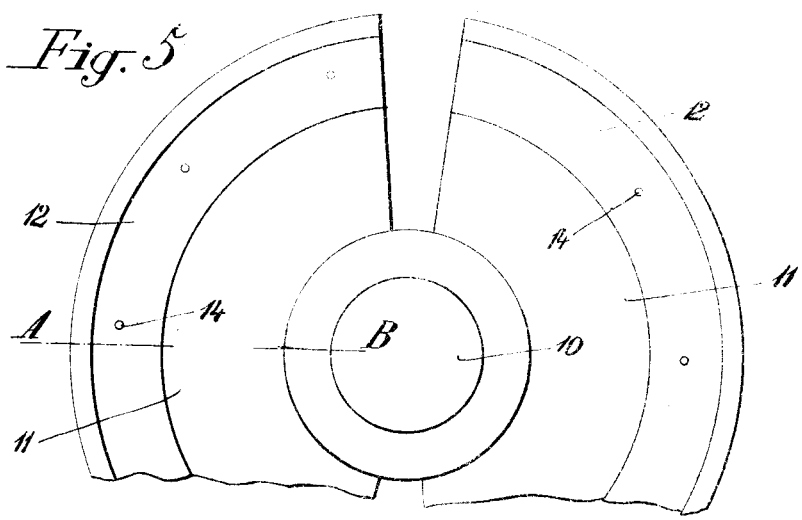
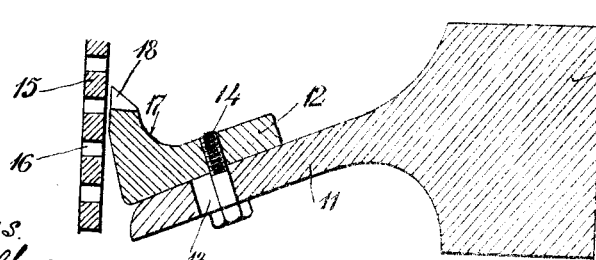

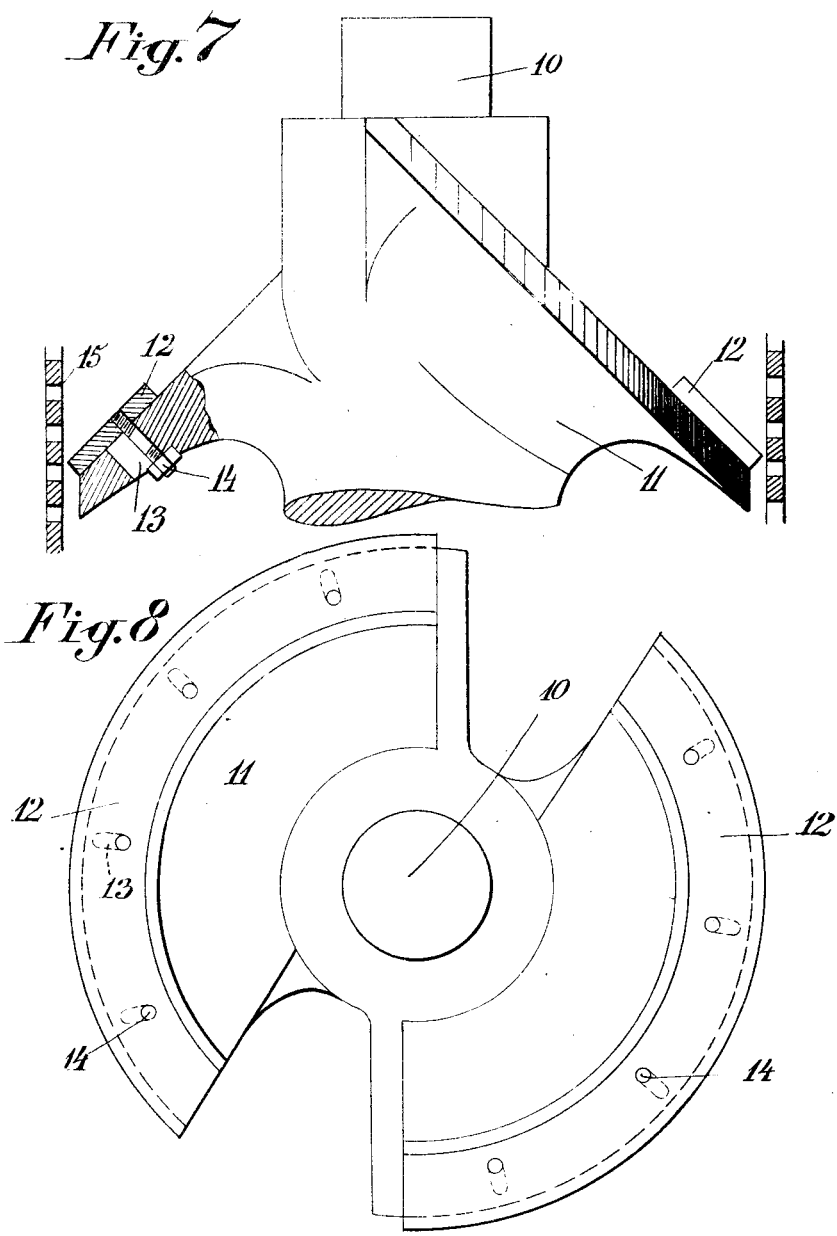

UNITED STATES PATENT OFFICE.

MICHAEL BOHN, OF NAGYKIKINDA, AUSTRIA-HUNGARY.

APPARATUS FOR SEPARATING GRANULAR ADMIXTURES FROM CLAY AND LIKE PLASTIC SUBSTANCES.

1,033,377.　　　　Specification of Letters Patent.　　Patented July 23, 1912.

Application filed September 29, 1910. Serial No. 584,389.

*To all whom it may concern:*

Be it known that I, MICHAEL BOHN, a subject of the King of Hungary, residing at Nagykikinda, in Austria-Hungary, have invented a certain new and useful Improvement in Apparatus for Separating Granular Admixtures from Clay and Like Plastic Substances, of which the following is a specification.

This invention relates to apparatus for separating granular admixtures from clay and like plastic substances, wherein the efficiency of the apparatus is increased by providing a main sifting appliance which discharges the granular matter with residual plastic matter into an auxiliary cleansing apparatus, either directly or through a connecting duct, and to provide the main and auxiliary cleansing or sifting appliances with a worm or propeller whereby the clay or like materials may be continuously forced into contact with the sieves of the cleansing appliances and with the circumferential edges of the blades or vanes of the feeding mechanism.

The invention further consists in providing the blades with radially movable scrapers which are thrust outwardly by gravity and by the back pressure of the work, as hereinafter described and claimed.

Several constructions embodying these improvements are shown in the annexed drawings.

Figure 9:
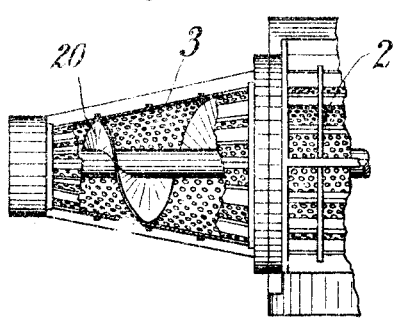
Figure 10:
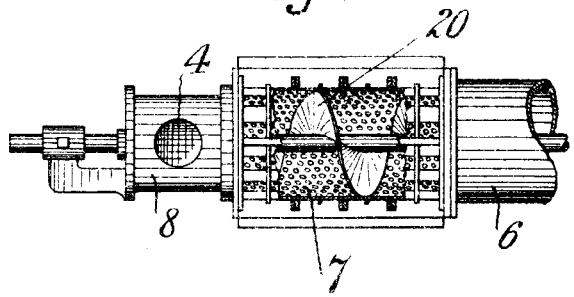

Figure 1 is a side-elevation of the apparatus, showing one form of auxiliary cleansing appliance, and Fig. 2 a similar view, showing another form of auxiliary appliance. Fig. 3 shows another modification of the auxiliary appliance alone. Figs. 4 to 6 show one form of the improved propeller, Fig. 4 being an elevation, with portions of the scrapers broken away. Fig. 5 an axial view, partly broken away, and Fig. 6 a section of half of Fig. 5 on the line A—B and on a larger scale. Figs. 7 and 8 show another form of the propeller, Fig. 7 being an elevation partly in section, Fig. 8 an axial view. Fig. 9 is a longitudinal sectional view through a part of Fig. 1, showing the feed mechanism within the auxiliary cleansing appliance, and Fig. 10 is a longitudinal sectional view through the auxiliary cleansing appliance of Fig. 2.

In the following description clay will be referred to as the substance treated in the apparatus.

Referring in the first place to Fig. 1, the part 1 is a hopper into which the crude clay is fed, and from which the clay is conveyed into the perforated cylinder 2 by a worm or screw-propeller not shown in the figure. The peripheral part of the worm is in contact with the inner surface of the cylinder 2, so that said surface is continuously scraped during the rotation of the worm, the perforations being by this means kept clear. The sieves, perforated plates or wire-nets forming the wall or parts of the wall of the cylinder are preferably made adjustable to allow of compensating for wear. The worm squeezes the greater part of the clay through the perforated cylinder-wall, but the latter retains the stones and other granular matter, together with some clay adhering thereto, and this granular matter and residual clay are forced by the worm into a perforated adjunct 3 of the cylinder. This adjunct is preferably conical, and as shown in Figs. 9 and 10 it contains an extension of the worm operating in the cylinder 2, but it is obvious that the worm may be separately driven and operated at a different speed. Manifestly, the sifting operation in the cone 3 may be effected solely by the pressure of the incoming granular material, but it is preferred to employ the worm 20 operating within the extension, for the reason that the worm feeds the material positively through said extension and into contact with the perforated wall thereof. The cone 3 is joined to the cylinder by devices adapted to maintain a continuous connection.

The advantage of the auxiliary sifting appliance 3 is that there is a continuous discharge of granular matter from the principal sifting appliance 2, instead of an accumulation liable to produce excessive back-pressure. By this means the efficiency of the machine is greatly increased, and the wear reduced.

In the modification shown in Fig. 2 the main sifting apparatus has a non-perforated conical adjunct 5 joined to a non-perforated cylinder 6, the latter being joined to an auxiliary sifting apparatus 7, which discharges the granular matter into a chamber 8 having an aperture 4 for removal of the granular matter. A branched water-pipe 9 is joined to the parts 5 and 6, so that the granular matter and adhering clay can be wetted by water under pressure during passage from the main sifter to the auxiliary sifter.

It is not essential that the auxiliary sifter is of smaller diameter than the main sifter, and the invention is not restricted to the use of any particular type of auxiliary cleansing appliance, the essential feature of this part of the invention being that the main sifter discharges into an auxiliary cleansing appliance.

Fig. 3 shows a modification of the auxiliary sifter 7, consisting of a cylinder with longitudinal slots.

Figs. 4 to 6 show a propeller, for forcing the clay into and through the sifters, with means for maintaining continuous contact between the sieves and the circumferential edges of the blades. Such continuity of contact is highly essential to the proper working of the apparatus, since otherwise the holes become clogged, necessitating frequent removal and cleansing of the sieves, and the wear of the latter and the worm or propeller tends to destroy the contact.

In Figs. 4 to 6, 10 represents the propeller shaft, with helical blades 11 fixed thereto. These blades have at their edges flanged scrapers 12 connected to the blades by screwed studs 14 the shanks of which work loosely in radial slots 13 in the blades, so that said scrapers have radial movement relatively to the shaft. The weight of the scrapers (if the shaft is vertical) and the back-pressure of the work on the inner surfaces 17 of the flanges, thrust the scrapers outward against the sieves 15, and by this means the sieve-holes 16 are efficiently cleared. The slots 13 are of sufficient length to enable contact to continue after normal wear of the sieves and scrapers. The flanges of the scrapers are not essential, but have the advantage of serving as guides for separated stones and the like, and also of deflecting the stones from the sieves, so that wear of the latter is reduced. This deflecting effect may be increased by giving the flanges a tapered edge, as indicated at 18, in Fig. 6. Other means than studs and holes or slots may be used for connecting the scrapers to the blades so that the former have radial movement.

It is clear that considerable freedom of movement of the scrapers is desirable, in order to prevent liability of jamming. In the modification shown in Figs. 7 and 8 the freedom of movement is increased by the shape of the blades 11, which have perfectly flat surfaces on which the scrapers 12 are slidable. In this modification the scrapers are shown without flanges, but they may have flanges, as in Figs. 4 to 6. On the flat surfaces of the blades in Figs. 7 and 8 the scrapers are less liable to bind than on the curved surface of an ordinary helical blade.

What I claim as my invention and desire to secure by Letters Patent of the United States is:—

1. In an apparatus for separating granular admixtures from plastic matter, the combination of a main sifting appliance, an auxiliary sifting appliance the dimensions of which are less than those of the main sifting appliance, means for continuously discharging separated granular matter and residual plastic matter from the main sifting appliance to the auxiliary sifting appliance, and means positioned within said auxiliary sifting appliance for feeding the material through it and forcing said material into contact with the walls of said auxiliary sifting appliance.

2. In an apparatus for separating granular admixtures from plastic matter, the combination of a main perforated sifting appliance with an auxiliary perforated sifting appliance, a duct, the walls of which are imperforate, positioned intermediate the main and auxiliary appliances and in direct axial communication therewith, means for continuously discharging the separated granular matter and residual plastic matter from the main sifting appliance to the auxiliary sifting appliance, and means for feeding the material through and forcing it into contact with the walls of the auxiliary cleansing appliance.

3. In an apparatus for separating granular admixtures from plastic matter, a main sifting appliance, an auxiliary sifting appliance coöperating with said main sifting appliance, a duct the walls of which are imperforate, said duct being positioned between said main and auxiliary appliances, means for continuously discharging separated granular and residual plastic matter from the main sifting appliance to the auxiliary sifting appliance, means for moistening the material within said duct, and a screw within said main and auxiliary sifting appliances, said screw coöperating with the walls of the sifting appliances to force the material therethrough and into contact with the walls thereof.

4. In an apparatus for separating granular admixtures from plastic matter, the combination with a receptacle having a perforated wall, and a propeller, of a scraper loosely mounted for radial movement on said propeller, said scraper being exposed to the back pressure of the material under treatment and adapted to be forced thereby into contact with the perforated wall of the receptacle.

5. In an apparatus for separating granular admixtures from plastic matter, the combination with a perforated receptacle, and a worm or propeller, of a plurality of radially movable scrapers attached to the blades of said worm or propeller, said scrapers being provided with pressure surfaces positioned rearwardly of the surfaces having contact with the perforated walls, said pressure surfaces being exposed to the back pressure of material under treatment in said receptacle whereby the scrapers are automatically moved into engagement with the walls of the receptacle.

6. In an apparatus for separating granular admixtures from plastic matter, the combination of a sifting appliance, and means for continuously discharging separated granular matter and residual plastic matter from said sifting appliance, said means comprising a worm or propeller having blades with flat front surfaces and radially movable flanged scrapers on said surfaces, said flanges contacting with the perforated wall of the sifting appliance and exposed to the back pressure of the material under treatment, whereby the scrapers are automatically moved into engagement with the sifting appliance.

7. In an apparatus for separating granular admixtures from plastic matter, the combination of a substantially cylindrical screen and means for continuously discharging separated granular matter from said screen, said means comprising a propeller having radially movable scrapers mounted on the front surface thereof, said scrapers being provided with sharp-edged forward flanges which coöperate with the perforated walls of the sifting appliances, whereby the back pressure of the material will thrust the scrapers into engagement with the perforated walls.

8. In an apparatus for separating granular admixtures from plastic matter, a receptacle provided with perforated walls, a feed screw or propeller contained within said receptacle, scrapers connected loosely to the propeller or feed screws, each scraper having a surface positioned for contact with the perforated wall of the receptacle, and said scraper being provided also with a curved surface, which curved surface is exposed to the back pressure of the material under treatment, whereby the scrapers are forced automatically into contact with the perforated wall of the receptacle.

9. In an apparatus for separating granular admixtures from plastic matter, the combination of a main sifting appliance, the walls of which are perforated, an auxiliary sifting appliance the capacity of which is less than that of the main sifting appliance, the walls of said auxiliary sifting appliance being perforated, an imperforate duct positioned between the main sifting appliance and the auxiliary sifting appliance, feed devices operating within the main sifting appliance and the auxiliary sifting appliance, and means for supplying liquid to the material within the imperforate duct between the two sifting appliances.

In witness whereof I have signed this specification in the presence of two witnesses.

MICHAEL BOHN.

Witnesses:
JOSEPH WIEKMANN,
HAUGH KEMÉNY.